July 4, 1933.  H. J. HEIDER  1,916,570
STOCK FEEDER
Filed Oct. 12, 1931   2 Sheets-Sheet 1
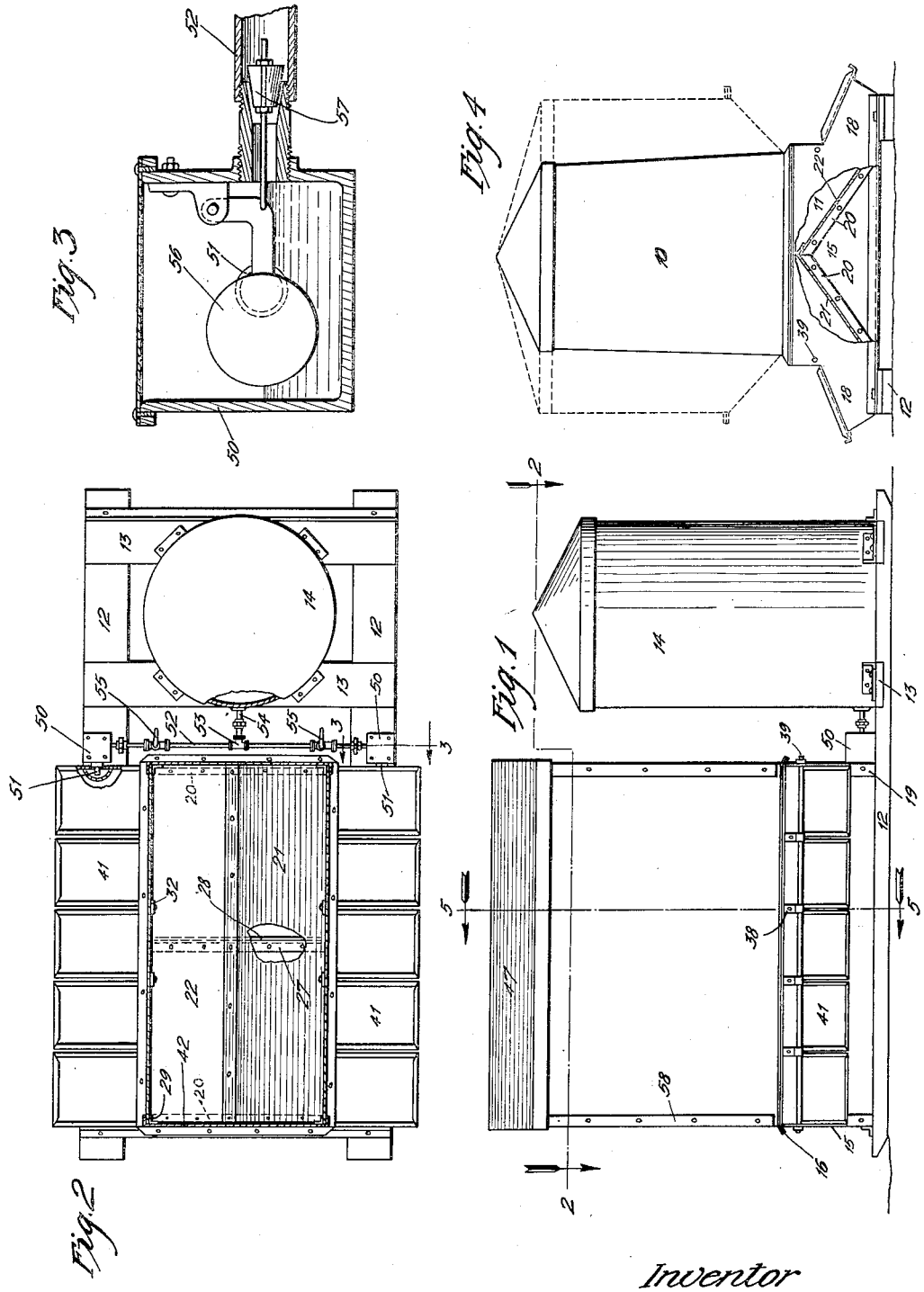
Inventor
Henry J. Heider
by Orwig & Hague Attys.

July 4, 1933.   H. J. HEIDER   1,916,570
STOCK FEEDER
Filed Oct. 12, 1931    2 Sheets-Sheet 2
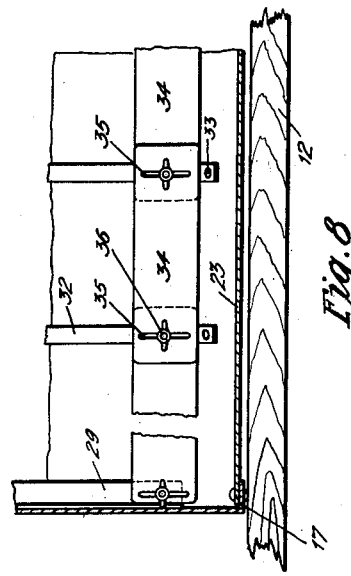
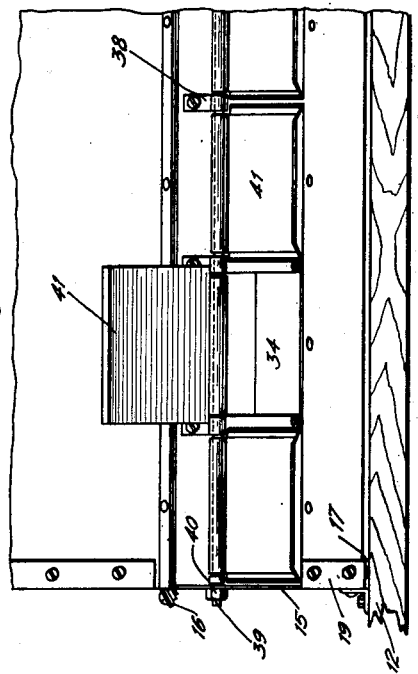
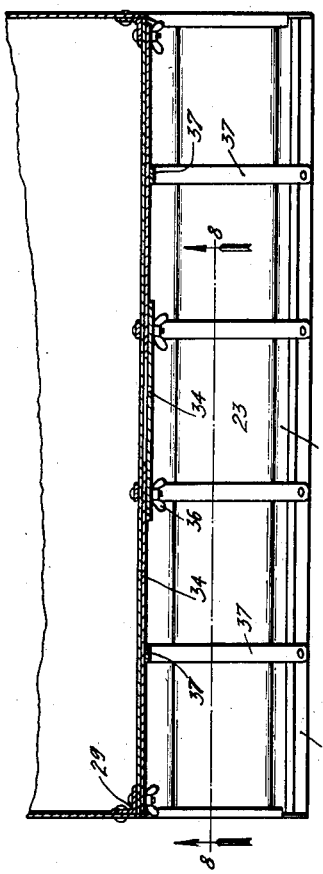
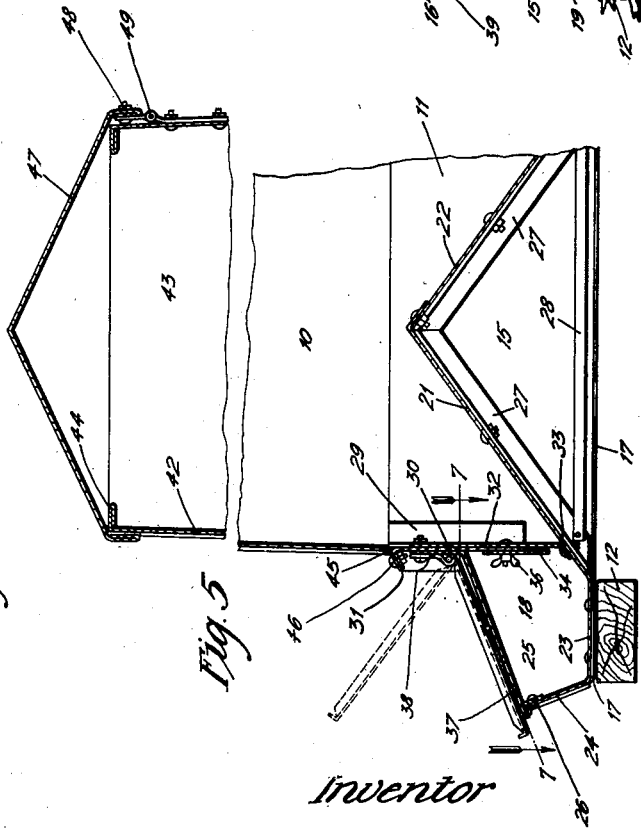
Inventor
Henry J. Heider
by Orwig & Hague Attys.

Patented July 4, 1933

1,916,570

UNITED STATES PATENT OFFICE

HENRY J. HEIDER, OF CARROLL, IOWA

STOCK FEEDER

Application filed October 12, 1931. Serial No. 568,395.

This invention relates to improvements in stock feeders of that type employing a hopper for storing a considerable amount of dry feed, and a feeder element beneath the hopper for automatically delivering the feed to suitable feed troughs from which the feed is delivered in a dry condition. It has been found by actual practice, however, that considerable advantage is gained if the feed is soaked in water before being fed.

It is, therefore, one of the objects of my invention to provide a stock feeder capable of automatically delivering dry feed to suitable feed troughs, and in connection therewith means whereby water may be automatically delivered to the troughs in such a manner that the feed will become soaked before eaten by the animals, and to provide in connection therewith means whereby either of the troughs may be supplied with water, or whereby the water may be cut off from both troughs at the will of the operator.

A further object is to provide a feeder adapted to deliver dry feed to suitable feed troughs, and automatic means for delivering water to said trough, and a suitable skid for mounting both the feeder and the watering mechanism whereby the feeder and the watering mechanism may be transported from one point to another as a single unit.

A further object is to provide a feeder which may be constructed principally of sheet metal and structural steel, and whereby the feeder may be constructed in units or sections which may be easily and quickly assembled to provide compact storage, and further to construct the feeder in sections for the purpose of cheapening the manufacturing cost, and so designed that a minimum number of heavier stock parts, such as angle and channel irons, are utilized, and whereby the cost of riveting and securing said angles to the sheet metal structure is eliminated.

A further object is to provide in an automatic stock feeder improved means for securing the hopper section to the feeder section, whereby hoppers of different sizes may be utilized to meet the requirements of users on a given feeder, and whereby the hopper may be easily and quickly attached to the feeder section and at the same time provide a water tight joint between the hopper section and the feeder section.

A further object is to provide a sheet metal feeder so constructed and arranged that the feed troughs may be easily sealed and made water tight.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a side elevation of my improved feeder.

Figure 2 is a top view of the same partly in section.

Figure 3 is an enlarged, detail, sectional view taken on the line 3—3 of Figure 2.

Figure 4 is an end elevation of my improved feeder, showing in dotted lines the manner in which an enlarged hopper may be applied to the feeder element.

Figure 5 is a segmental sectional view taken on the line 5—5 of Figure 1.

Figure 6 is an enlarged segmental, side elevation of one side of my improved feeder, showing the trough portions and the doors covering the same on an enlarged scale.

Figure 7 is a detail sectional view taken on the line 7—7 of Figure 5.

Figure 8 is a detail sectional view taken on the line 8—8 of Figure 7.

My improved feeder comprises a hopper 10 and a feeder section 11 carried by suitable skids 12. Said skids 12 project beyond one end of the feeder, to provide a platform 13 for supporting a suitable water tank 14, whereby the water tank and feeder may be transferred from one point to another as a single unit.

The feeder section 11 comprises end members 15 formed of sheet metal having their upper edges bent outwardly and downwardly to form a flange 16. The lower end of each of the members is provided with an inwardly bent portion to form a flange 17. The flanges 16 and 17 provide means for stiffening the upper and lower edges of the end members 15, and thus eliminate the necessity of employing angle irons, which heretofore has been the custom.

Each end of each end member 15 is provided with an outwardly extending portion 18. The top edge of each member 18 is inclined downwardly and outwardly, and its outer end provided with an inwardly extending portion 19.

Supported adjacent to the inner surface of each of the members 15 is a pair of angle irons 20, the upper ends of said angles being supported together midway between the ends of the members 15 and near their upper edges, while the bottom ends of the members 20 rest on the flange 17.

Supported on the members 20 are bottom plates 21 and 22, the upper end of the plate 21 overlapping the upper end of the plate 22. The lower edge of each of the plates 21 engages the flange 17, terminating in a horizontal portion 23, thence in an upwardly extending portion 24 to form a trough 25. The ends of the members 24 are secured to the members 19. The top edge of the member 24 is provided with an angle iron 26 to stiffen the same. The ends of the members 24 and 23 and the lower portion of the members 21 and 22 are soldered or otherwise sealed to the members 18 to form water tight troughs. The bottoms of the troughs 25 rest on the skids 12 in the manner shown in Figures 1, 2 and 5.

On the under surface of the members 21 and 22 and between their ends I have provided angles 27 having their lower ends tied to the brace bar 28, thus providing means for stiffening the central portion of the bottom members 21 and 22. The lower ends of the members 27 terminate near the skids 12. The angles 20 may be permanently fixed to the end members 15, while the bottom members 22 are detachably connected by suitable bolts, so that the end members and the said bottom members may be manufactured as separate units and shipped in a knocked-down form, if so desired, and assembled by simply bolting the members 21 and 22 to the angles 20.

Supported on the inner surface of each of the members 15, near their ends, I have provided vertical angle irons 29 designed to support side plates 30. The upper edge of each of the plates 30 is bent outwardly and downwardly to form flanges 31. The lower edge of each of the plates 30 terminates a slight distance above the bottom members 21 and 22, to provide a space through which feed may enter the troughs 25 from the hopper hereinafter described.

The lower edge of each of the members 21 and 22 terminates in the horizontal portion 23 at a point outside of the plate 30, in the manner shown in Figure 5.

Adjacent to the back of each plate 30 I have provided a series of downwardly projecting supporting bars 32 having their lower ends fixed to the bottom edges of the members 21 and 22 by suitable bolts or rivets 33. Said bars 32 are designed to support and fix the said plate 30 against outward movement when pressure of the feed is applied to the inner surface of the plates.

Adjustably supported to the lower edge of each of the plates 30 is a series of closure devices, or dampers 34, for the purpose of regulating the size of the feed openings beneath the plates 30. Each of the dampers 34 has a vertical slot 35 near its end. Said dampers are arranged in overlapping position, as shown in Figure 8, with the slots of one damper in alinement with the slots of an adjacent damper. Set screws 36 are secured to the bars 32 to provide means for supporting the dampers in desired elevated positions.

Supported adjacent to the front face of each of the plates 30 is a series of spacer bars 37, designed to have their lower ends extend downwardly and outwardly and to rest on the top surface of the angle 26. Supported over each of the spacer bars 37 is a short bar 38 having its lower end looped to receive a rod 39, said rod being of a length slightly greater than the entire length of the feeder, and having each end screw threaded and extending through the end members 15. The screw threaded ends have nuts 40 to bind the end members 15 to the ends of the side plates 30. The rod 39 also serves as a hinge member for a series of doors 41, each of which is pivotally connected to said rod at its upper end, and having its lower end supported on and terminating beyond the angle iron 26. The doors 41 are placed between the members 38 in the manner clearly illustrated in Figure 6.

Thus a single rod is provided for supporting all of the doors of one of the troughs 25 and at the same time providing means for binding the end members of the feeder to the side members. The lower ends of the bars 37 are secured to the angle 26.

By this arrangement it will be seen that the plate 30, the dampers 34, the bars 37 and 38, and the doors 41 may all be assembled as a single unit and attached to the angle irons 29 after the unit has been assembled, and after the bottom members 21 and the end members 15 have been assembled. The ends of the rods are inserted through the end members at the time the side plate is applied, and the nuts 40 placed in position.

The hopper 10 comprises side members 42 and end members 43. The top edges of the side and end members are each provided with an inwardly extending portion 44, which is rebent beneath itself to form a flange. The lower edge of each of the side and end members is provided with an outwardly and downwardly extending flange 45, designed to rest on the flanges 16 and 31. Suitable bolts 46 are provided for securing said flanges together, thereby providing means for detachably mounting the hopper.

By inclining the flanges downwardly and outwardly, means is provided for preventing water from entering the hopper, and thus preventing dry feed in the hopper from caking and causing the feeder to become inoperative.

The ends of the members 43 are provided with laterally extending portions 58, which are overlapped on the ends of the outer surface of the members 42 and riveted or otherwise secured thereto. Said flanges anchor the side members and stiffen the end members.

A cover 47 is also provided having its side and end edges provided with downwardly extending flanges 48, said flanges being rebent upon themselves to strengthen them. One of the flanges 48 is provided with hinges 49 which are bolted to one of the side members 42, thus providing means for hinging the cover to the hopper. The flanges 48 extend downwardly over the upper ends of the members 42 and 43 to prevent water from entering the hopper between the cover and the top edges of the side and end members.

Supported on each of the skids 12 adjacent to one end of the troughs 25, I have provided a float casing 50. A pipe 51 connects each of the casings with the adjacent trough. A pipe 52 is supported to connect the two casings. The central portion of the pipe 52 has a T 53 to which a pipe 54 is connected. One end of the pipe 54 is connected to the tank 14. Each end of the pipe 52 is provided with a control valve 55. Each of the casings 50 has a float 56 designed to control a valve 57 supported in each end of the pipe 52 in such manner that water may be automatically delivered from the tank 14 to the troughs 25. The valve 55 provides means whereby water may be cut off from either of the troughs 25, or from both of them.

Thus means is provided whereby dry feed will be automatically delivered to the troughs and water simultaneously delivered for soaking the feed. If desired, one of the valves 55 may be closed while the other is open, so that feed may be delivered to one of the troughs 25 and fed in a dry state, and feed delivered to the other trough and soaked before feeding.

If it is desired, a partition may be placed in the hopper so that one end of the hopper may feed one kind of feed, which may be in the dry state, and the other end of the hopper provided with another kind of feed, which may be fed in a wet state.

If it is desired, the hopper illustrated by solid lines in the drawings may be substituted for a larger hopper illustrated by dotted lines in Figure 4, simply by removing the bolts 46. At other times it may be desired to feed dry feed only, in which case both of the valves 55 are closed.

Thus it will be seen that I have provided a stock feeder constructed principally of sheet metal, and in such a manner that substantially all of the heavy structural steel is eliminated, thereby eliminating the cost of the structural steel as well as the cost of riveting or securing the steel members to the sheet metal, and at the same time provide a stiff and rigid structure.

Furthermore, it will be seen that I have provided an improved feeder which may be easily manufactured in sections in such manner that the sections may be stacked in a compact form while in storage or during shipment, and whereby the feeder may be easily and quickly assembled when desired.

Furthermore, it will be seen that I have provided in connection with a stock feeder means for automatically delivering predetermined quantities of water to the troughs. Said feeder and automatic watering device are mounted on a single frame on skids, which may be transported from one point to another without disconnecting the watering device from the feeder.

A further advantage in my improved construction resides in the fact that the lower edges of the side plates 30 terminate vertically above the lower edge of the inclined bottom members, and inside of the inner edge of the horizontal portion of the bottom of the troughs, so that dry feed sliding downwardly into the trough will not become clogged. The lower edges of the side plates 30 are above the normal water level within the trough. That portion of the feed passing through the opening between the bottom edge of the side plate 30 and the bottom member 21 will not become soaked, inasmuch as said passage is above the water level and thus prevents caking and clogging of the feed.

I claim as my invention:

1. A stock feeder comprising in combination a skid, an automatic stock feeder including a feed trough, a water tank carried by said skid, a float casing, and pipes connecting said float casing with said trough and to said tank, whereby dry feed and water may be fed automatically to said trough.

2. A stock feeder comprising in combination a skid, an automatic stock feeder including feed troughs, a water tank carried by said skid, a float casing adjacent to one end of each of said troughs, a pipe connecting each of said casings to an adjacent trough, a pipe connecting said casings, a valve in each end of the last said pipe, and a pipe for connecting the last said pipe to said water tank, whereby dry feed and water may be simultaneously and automatically fed to said troughs.

3. A stock feeder comprising end members, the bottom edges of each end member being bent inwardly to form a reinforcing flange, downwardly and outwardly inclined bottom members between said ends having their lower side edges bent upwardly to form troughs, side plates between said ends and above the lower portions of each bottom member, the top edge of each end and side member being bent downwardly and outwardly to form reinforcing flanges, a hopper having its lower edges bent downwardly and outwardly to form a flange to fit the top flange of said feeder, and means for securing said flanges together.

4. A feeder comprising end members, each having its lower edge bent inwardly to form a flange and its top edge bent outwardly, downwardly and outwardly inclined angles secured to the inner surface of each end plate having their lower ends terminating near said inwardly extending flange, a bottom member carried by each corresponding set of angles having a trough portion resting on said flanges, a skid beneath each trough, an angle secured to the central portion of the under surface of each of the bottom members, and a brace connecting the lower ends of said angles.

5. A stock feeder comprising a trough portion having end members, the bottom edges of each end member being bent inwardly to form a reinforcing flange, downwardly and outwardly inclined bottom members between said ends having their lower side edges bent upwardly to form troughs, the ends of said troughs resting on and fixed to said inwardly projecting flanges, side plates between said ends and above the lower portions of each bottom member, the top edge of each end and side member being bent downwardly and outwardly to form flanges, a hopper member having its lower edges provided with laterally projecting flanges designed to rest on the flanges of said trough member, and means for securing said flanges together.

6. A stock feeder comprising a hopper, a trough adjacent to each side of the lower end of said hopper for receiving feed therefrom, a skid supported longitudinally beneath each of said troughs, one end of said skid extending beyond the hopper, cross members for connecting the extending ends of said skid, a tank carried by said cross members, a float chamber adjacent to the inner end of each of said troughs, a pipe connecting said float chambers, a pipe connecting the last said pipe with said tank, a hand actuated valve near each end of the first pipe, a pipe connecting said float chamber with each of said troughs, a valve in each of the last said pipes, and a float controlling each of said valves.

Des Moines, Iowa, September 15, 1931.

HENRY J. HEIDER.